(12) United States Patent
Filipovski

(10) Patent No.: US 6,348,818 B1
(45) Date of Patent: Feb. 19, 2002

(54) VOLTAGE-ADDER LED DRIVER

(75) Inventor: Menachem Filipovski, Bnei Brak (IL)

(73) Assignee: Ledi-Lite Ltd., Qiryat Gat (IL)

( * ) Notice: Subject to any disclaimer, the term of this patent is extended or adjusted under 35 U.S.C. 154(b) by 0 days.

(21) Appl. No.: 09/637,632

(22) Filed: Aug. 14, 2000

(51) Int. Cl.$^7$ ............................ H03B 1/00; H03K 3/00
(52) U.S. Cl. ................ 327/108; 327/109; 327/536; 327/589; 326/88; 363/59; 363/60
(58) Field of Search ................ 327/109, 585, 327/361, 589, 536, 108, 110, 111; 307/110; 363/59, 60; 326/88, 92; 361/56

(56) References Cited

U.S. PATENT DOCUMENTS

| | | | | |
|---|---|---|---|---|
| 4,965,696 A | * | 10/1990 | Kumpfmueller et al. | 363/60 |
| 5,262,934 A | * | 11/1993 | Price | 363/60 |
| 5,790,393 A | * | 8/1998 | Fotouhi | 363/60 |
| 5,923,155 A | * | 7/1999 | Semmler | 323/266 |
| 5,943,200 A | * | 8/1999 | He | 361/56 |
| 5,955,909 A | * | 9/1999 | Lenz et al. | 327/361 |

* cited by examiner

Primary Examiner—Terry D. Cunningham
Assistant Examiner—Long Nguyen
(74) Attorney, Agent, or Firm—Mark M. Friedman

(57) ABSTRACT

A voltage-adder circuit, which adds the charge stored on a capacitor during a switch off-time, to the voltage of the input battery/power-supply, to provide an output voltage greater than the input voltage. The circuit is especially well-suited for use as an LED driver, and may be also used as a voltage booster for low-voltage electronic circuitry, such as electronic watches; as a back-bias generator for use inside integrated circuits; and, as a gate-bias-voltage generator, for use with depletion-mode GaAsFETs, such as are used in the transmitters of cellular telephones. The circuit obtains high efficiency operation by the use of inductors to charge a storage capacitor. Switches may be added. The invention includes a novel self-operating switch.

6 Claims, 5 Drawing Sheets

VOLTAGE-ADDER LED DRIVER

BACKGROUND OF THE INVENTION

Light-emitting diodes (LED's) are useful as an illumination source in signs for example, in simple house-number signs. It is desirable that the illumination source be reliable, and have high efficiency, both in terms of light output, and with respect to low power consumption from the power source. Also, low cost is important, in order to have the largest possible market for any product. For the house number sign application, an AC line-operated power source is undesirable, due to both inconvenience and cost.

In response to this need, a high-efficiency, low power consumption, low-cost, LED light source is provided, which is battery-operated, operating from one cell. The inventive voltage-adder, LED driver circuit provides an increased voltage, greater than the battery voltage, for powering the load, in this application, a LED.

The inventive voltage-adder circuit may also be used for providing an increased supply voltage to other circuitry having such a need. Additional applications include use as a battery-voltage booster for watch circuits; use as a back-bias generator for providing faster response time in integrated circuits; and, as a gate-bias-voltage generator, for use with depletion-mode GaAsFETs, such as are used in the transmitters of cellular telephones. The latter two applications benefit from the provision of a voltage-adder output voltage of opposite polarity to the input supply voltage, rather than providing a voltage-adder output voltage of the same polarity as the input supply voltage.

1. Field of the Invention

She field of the invention is voltage-adder circuits, especially, voltage-adder circuits suitable for operating from a single battery cell, for the purpose of driving a LED, such that the LED provides the appearance of continuous illumination.

Such a voltage-adder circuit is suitable for other applications, as mentioned, and even if not operating from a single cell, but rather, operating from a multiple-cell battery.

Also, the circuit of the present invention may be used to provide an auxiliary output voltage from any power supply, including, for example, AC line-voltage or solar-powered power-supply systems.

2. Description of the Prior Art

Prior-art LED driver circuits generally provide continuous, direct-current drive to the LED, or other load, or provide LED pulsing at a very low rate, say, one blink per second, thereby providing a "blinking-LED" function. DC drive is not suitable for a high-efficiency system, and blinking effect is not suitable for a normal sign illumination source.

Prior art circuits include, capacitive voltage doubler circuits, and flyback switching converter circuits.

Capacitive voltage doubler circuits, whether voltage-inverting, or step-up circuits, are illustrated in FIGS. 2A and 2B, respectively. Both circuits may be arranged to provide, ideally, a maximum output voltage of 2(Vin−VF), where Vin is the battery voltage, and VF is the diode forward voltage drop.

The two forward diode voltage drop is significant with respect to the voltage of one cell. Germanium diodes and Schottky diodes have forward drops of about 0.25 to about 0.3 volts. Twice this is about one-third to one-half of the voltage of a single alkaline cell.

In the prior-art circuit of FIG. 2A, when switch SA is in position 1, capacitor C1 charges through forward-biased diode D1 to (Vin−VF). When switch SA is subsequently connected to the negative input supply terminal 2, the left side of capacitor C1 is connected to zero volts, and since the voltage across a capacitor does not change instantaneously, the voltage at the right-hand side of capacitor C1 is driven to −(Vin−VF). Diode D2 is then forward-biased, charging capacitor C2 to VO=−(Vin−2VF), the indicated output voltage across capacitor C2. The circuit is, ideally, a voltage-inverter, in the case of VF=0. Also, the voltage difference between then input supply voltage and Vo is Vin−Vo=Vin−[−(Vin−2VF)]=2(Vin−VF), as stated, providing a very poor voltage-doubler circuit, due to the 2VF voltage drop on the two diodes.

In the prior-art circuit of FIG. 2B, when switch SB is connected to position 1, capacitor C1 charges through diode D1 to (Vin−VF), and capacitor C2 charges to (Vin−VF). When switch SB is subsequently connected to position 2, the left-hand side of capacitor C1 is connected to Vin, and diode D1 is reverse-biased. Since the voltage on a capacitor does not change instantaneously, the voltage on the right-hand side of capacitor C1 is (Vin+[Vin−VF)]). Capacitor C2 is charged by capacitor C1 through diode D2 to Vo=2(Vin−VF), as stated, again providing a very poor voltage-doubler circuit.

Flyback switching converter circuits include an inductor, a normally-closed switch, a rectifier diode and an output storage capacitor, and use a controller circuit to provide a regulated DC output voltage. The circuit is expensive for this application.

SUMMARY OF THE INVENTION

The present invention provides a circuit for driving a LED from a single-cell battery power source. Since the forward, "ON", voltage of the LED is greater than the one-cell battery voltage, the circuit is required to provide an increase of the voltage applied to the LED, of magnitude greater than the single cell voltage.

A novel "voltage-adder" circuit is provided. The inventive voltage-adder circuit provides a greater output voltage than prior art circuits.

A novel, single-cell, battery-operated, voltage-adder circuit is provided for pulsing the LED at a sufficiently rapid rate, that the visual impression of a continuous light source is given.

The goals of the present invention are accomplished by providing a novel voltage-adder circuit, which uses inductors, rather than diodes, in the voltage adding circuitry, thereby providing a greater increase in output voltage than can be achieved with prior art circuits, and with greater efficiency.

One switch is required in the basic circuit. The switch on-state forward voltage drop depends on the switch device chosen, and may typically be about, say, 0.1 volt, small with respect to the voltage of a single cell. Alternative topologies use additional switches, as will be described.

The system incorporates a low-standby drain oscillator, for driving the switches, thus maintaining high system efficiency.

In our application, a rechargeable alkaline cell is used, with solar cell recharging. Oscillator-disabling circuitry is provided, which assures reliable re-starting of the oscillator, upon removal of the oscillator-disable input signal.

Figure 1A:
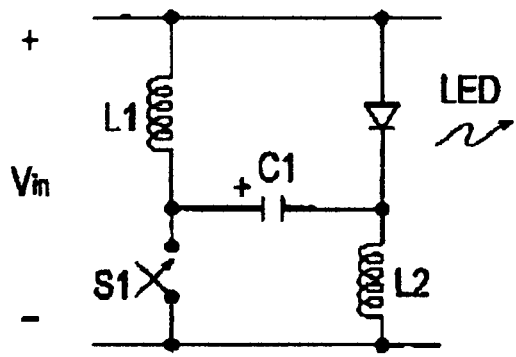
FIG. 1A shows the basic voltage-adder circuit driving a LED.

DETAILED DESCRIPTION OF THE INVENTION:

The present invention will now be described with reference to the drawing figures in sufficient detail to enable one normally skilled in the art to practice the invention. Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

FIG. 1A shows the basic voltage-adder circuit driving a LED. The circuit comprises a switch, shown here, implemented by switch S1, and the network L1, C1, L2, driving the LED, LED.

S1 is normally-open, for a relatively long off-time, during which off-time, C1 charges through L1 and L2, to substantially the input supply voltage, Vin. While any load in general may be used, our primary application is as a LED driver, hence the load is represented by LED.

Figure 1B:
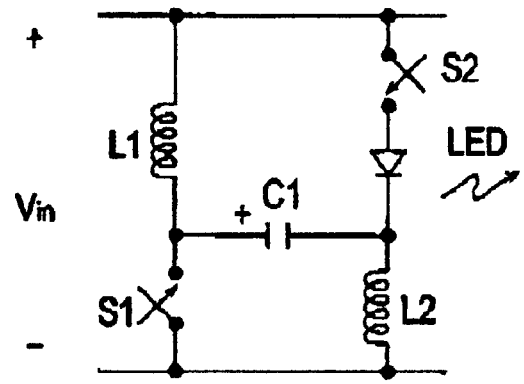
FIG. 1B shows the voltage-adder circuit, with a second switch, driving a LED.

FIG. 1B adds switch, S2, to the circuit of FIG. 1A. If a LED is used, which has a sufficiently low turn-on voltage in the operating temperature range of interest, such that a significant off-time current is drawn by LED, then switch, S2, driven in-phase with S1, may desirably be added, in order to disconnect LED during S1 off-time, which is the nominal LED off-time, thereby increasing effficiency of the circuit, by reducing off-time supply drain.

Figure 1C:
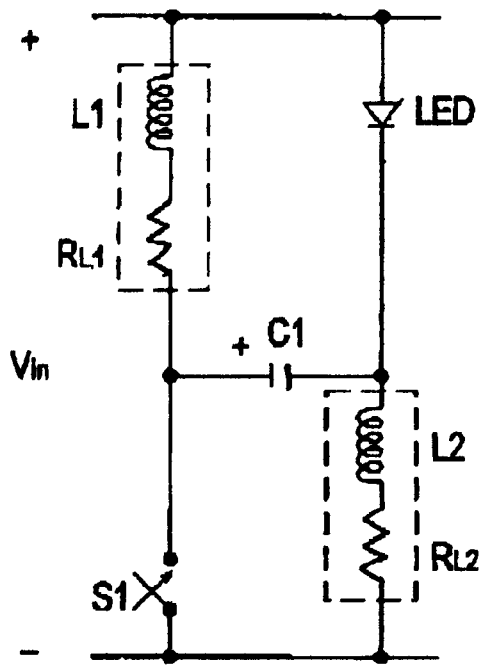
FIG. 1C adds series resistance of a real inductor to the ideal inductor of FIG. 1A.
Figure 1D:
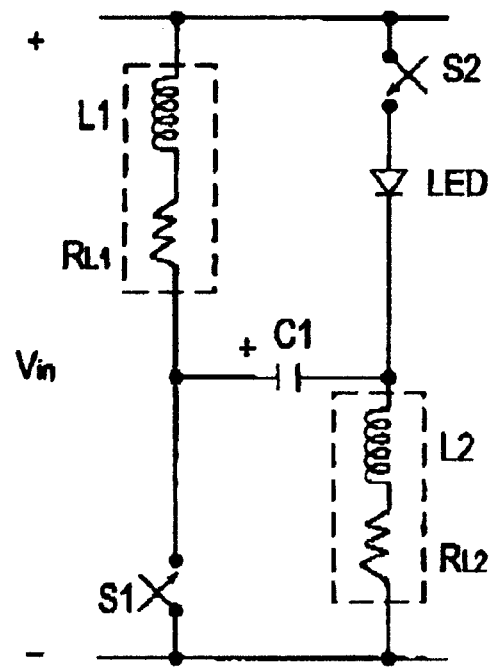
FIG. 1D adds series resistance of a real inductor to the ideal inductor of FIG. 1B.

FIGS. 1C and 1D correspond to FIGS. 1A and 1B, with the substitution of the series combination of an inductor and a series resistor for each inductor in FIGS. 1A and 1B. The series combination of an inductor and a resistor, is a representation of a real, physical, circuit component. An ideal inductor has no series resistance, while, a real, physical, inductor has finite "internal" series resistance, due to the resistance of the wire of which the inductor coil is wound. Thus, the series resistance should be taken into consideration, when designing real circuits. The series resistance should therefore be included in circuit simulations, as a resistor in series with the ideal inductor model provided by the circuit simulator program.

Further, inclusion of additional series resistance, external to the real inductor, provides an additional degree of freedom, in adjusting the circuit waveforms.

However, we believe that the maximum efficiency is achieved using the minimum resistance possible, whether internal, or external to the inductor, in series with the inductor. In other words, we believe that the highest-Q inductor possible should be used.

For the purpose of the claims language, the circuit is claimed as including inductors. While internal series resistance of the inductor is not written into the claims language, the definition of an inductor, for the purpose of the claims language, is to be understood to include internal series resistance of the real, physical, inductor, and additional series resistance external to the inductor, which may be provided. When switches are added in series with the inductors, the external resistance also includes the switch on-resistance.

Figure 2A:
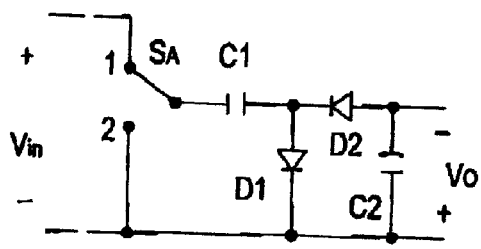
FIGS. 2A and 2B show prior art capacitive charge-pump circuits.
Figure 2B:
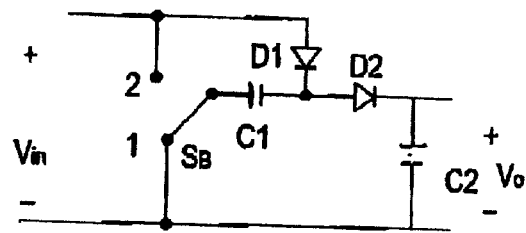

FIGS. 2A and 2B have been mentioned in the prior art discussion. The disadvantage of the two forward diode voltage drops has been mentioned. Since the forward voltage drop of even one diode is about three times the on voltage drop of one switch, as used in the present invention, the desirability of eliminating the diodes in the prior art capacitor charge pump circuit may be readily appreciated. The addition of switches may be beneficial, as will be discussed.

Figure 3A:
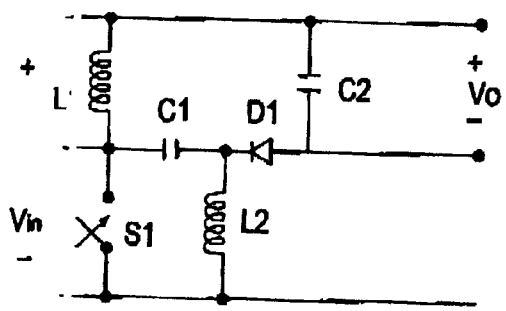
FIGS. 3A and 3B show two connections of a rectifier diode and capacitor included in the load circuit.
Figure 3B:
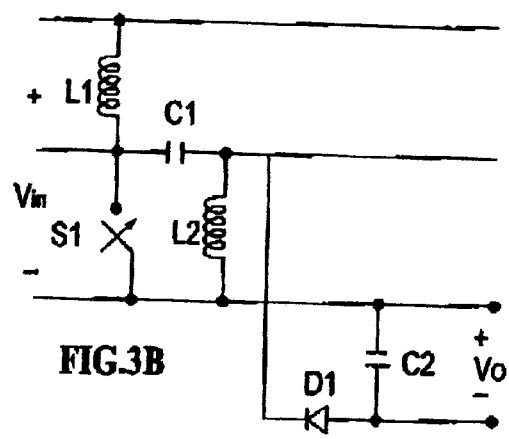

FIGS. 3A and 3B illustrate additional applications of the present invention, in which one diode is, however, necessarily added in to the load circuitry. This still provides an improvement over the prior art, in these additional applications, of the elimination of one on-voltage forward diode voltage drop. For the non-LED-driver applications mentioned above, a nominally DC output voltage is desirable. Hence, a rectifier diode is connected from the junction of capacitor C1 and inductor L2 to a second capacitor C2. Capacitor C2 stores charge received from capacitor C1 during the on-time of S1, thereby providing a DC output voltage to subsequent, additional, load circuitry, which may be connected across capacitor C2. The mentioned applications, watch power supplies, back-bias voltage generators, and GaAsFET gate bias voltage supplies, are all low-current-drain applications.

FIG. 3A illustrates a circuit providing Vo=2Vin−VF, and FIG. 3B illustrates a circuit providing Vo=−(Vin−VF), both improving on the performance of the prior-art circuits of FIGS. 2A and 2B.

Figure 4:
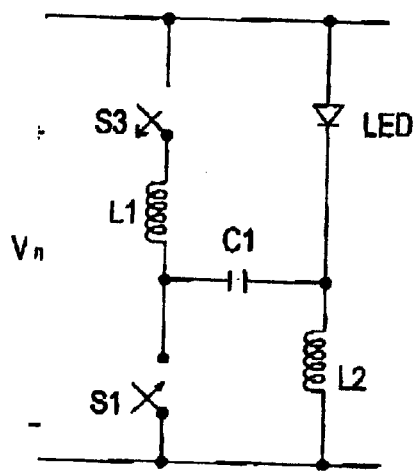
FIG. 4 shows the circuit of FIG. 1, with a third switch added in series with L1.

FIG. 4 illustrates the addition of switch S3 in series with inductor L1, for the purpose of efficiency improvement. Switch S3 is driven out-of-phase with switch S1, in order to disconnect inductor L1 from the positive supply during switch S1 on-time, in order to remove the non-usefull current flow in inductor L1 during the on-time of switch S1. This also has the advantage of helping reduce the on-state voltage drop of switch S1.

Figure 5:
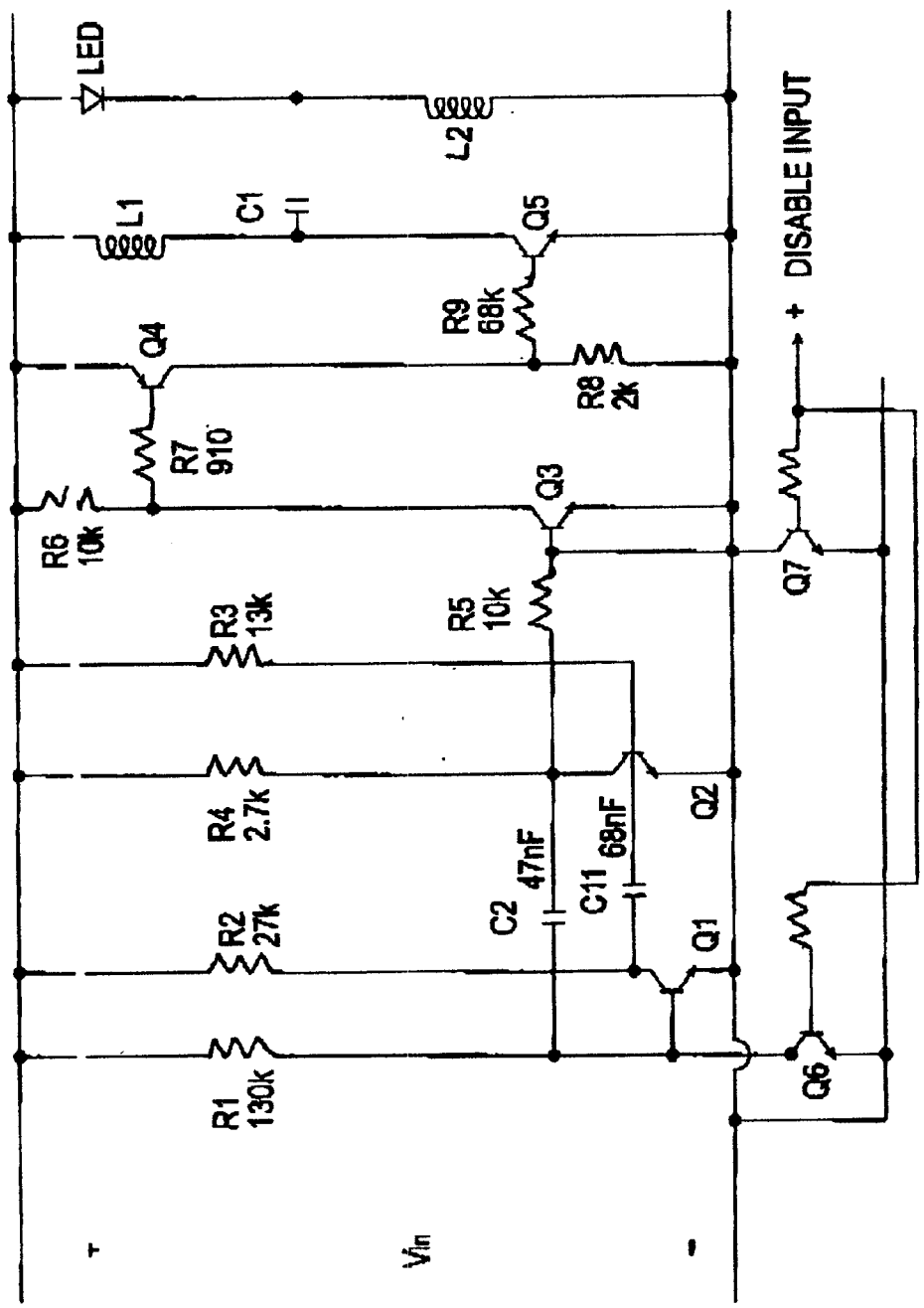
FIG. 5 shows a complete voltage-adder circuit, including oscillator and intermediate switches, driving a LED.

FIG. 5 shows a complete voltage-adder circuit, including oscillator and intermediate switches, driving a LED. In order to achieve high system efficiency in a practical LED driver system, the total off-time supply drain must be minimized. However, a substantial current pulse must be provided to the switch S1 during the on-time of switch S1 and LED. In order to provide the substantial LED current pulse, a large base drive current must be provided to switch transistor Q5, which provides the function of switch S1, of FIG. 1. If the oscillator circuit built around transistors Q1 and Q2 were to provide the required base drive to Q5, the current-in resistor R4, would be prohibitively large during the LED off-time. Hence two stages of buffering between the oscillator and the switch are provided. The two stages of buffering, including transistors Q3 and Q4, reduce the drive required from resistor R4 by about a factor of one-hundred, since each switch stage is designed for a forced beta of 10. This significantly reduces the standby current drain of the system, increasing system efficiency, as desired.

The LED driver is used in an application, in which the appearance of continuous illumination is desired. Such an appearance may be accomplished by pulsing the LED at a sufficiently fast rate. The apparent brightness perceived depends on the intensity of the pulse. The design goal on-time and off-time of the circuit of FIG. 5 are about 0.8 msec on-time, and about 6.25 msec off-time. This provides a sufficiently-fast repitition rate to provide the appearance of continuous illumination. The selected component values in the voltage-adder LED driver output circuit, which provide the desired brightness for our application, were arrived at empirically.

In operation, during the LED off-time, capacitor C1 is charged through inductors L1 and L2, to the input supply voltage, Vin. Then, when switch S1 turns on, the left-hand side of capacitor C1 is, ideally, pulled down to the negative terminal of the input voltage supply, and the right-hand side of capacitor C1 is pulled down, ideally, to the value, −Vin, thereby, ideally, providing a voltage difference of 2Vin across the LED, during the LED on time. The actual voltage difference across the LED will be less than 2Vin by the amount of Vsat of Q5(S1).

Another feature of the circuit is the provision of transistors Q6 and Q7, for turning off transistors Q1 and Q3, respectively, to provide reliable turn-off and startup of the oscillator circuit. Reliable startup of the oscillator is assured by forcing transistors Q1 and Q2, into appropriate states.

The illustrated voltage-adder LED driver circuit is used with a solar cell recharging circuit with a single rechargeable alkaline battery cell. The design of our system is such that, in the daytime, when the solar cell is recharging the battery, the LED illumination is not required, and the oscillator is disabled, thereby maximizing the battery recharging capability. When the solar cell output disappears, at night, and the oscillator is required to function, the two oscillator-disable transistors, Q6 and Q7, turn off, and the oscillator must reliably restart. Q7 turns off Q3, thereby reliably holding off Q5(S1), and Q6 is added to force the astable multivibrator oscillator, including transistors, Q1 and Q2, into a state from which the oscillator will reliably restart, when Q6 and Q7 turn off.

Figure 6:
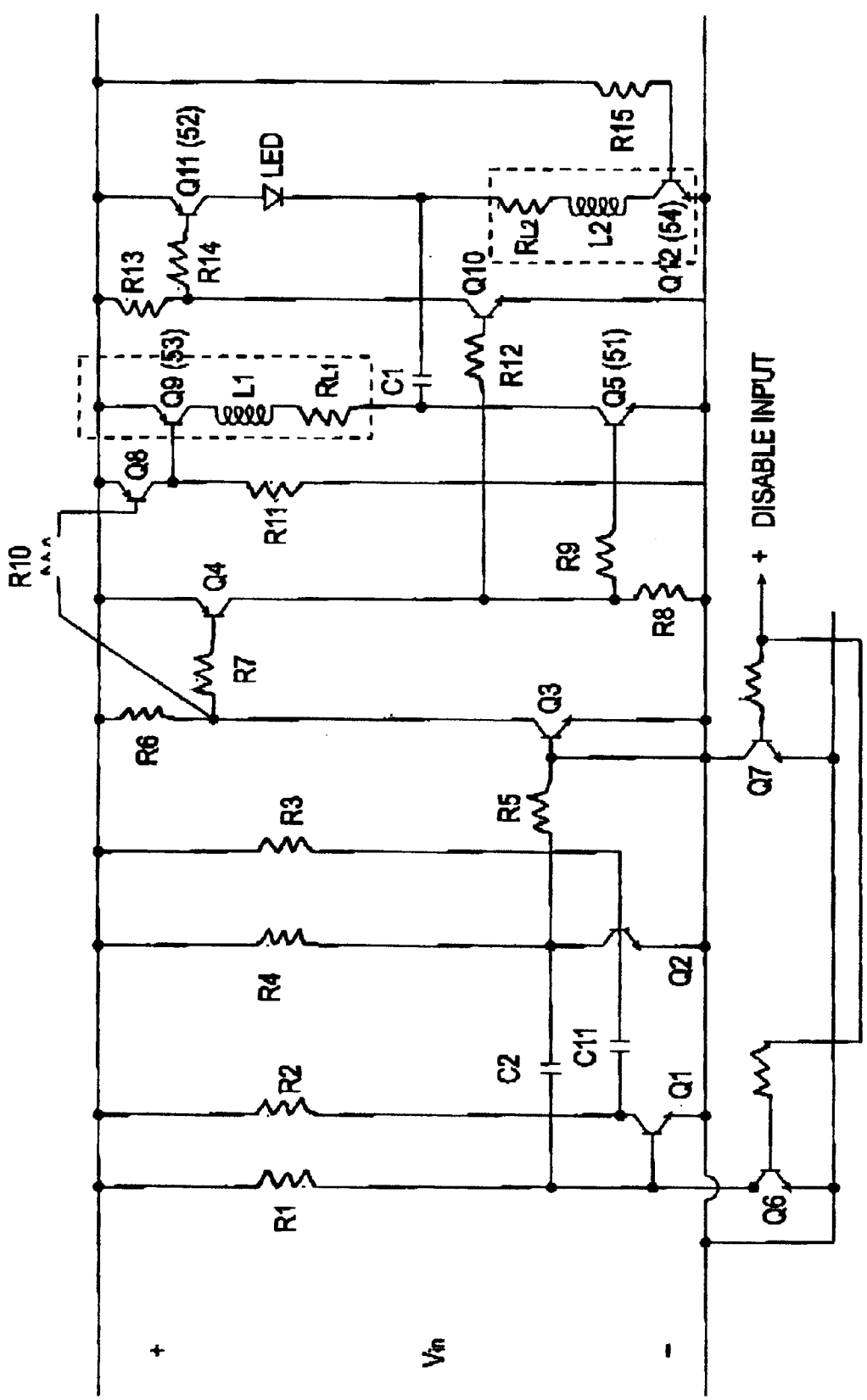
FIG. 6 shows a second voltage-adder circuit, including oscillator and intermediate switches, driving a LED, further including additional switches and switch drive circuitry, including a novel self-operating switch, S4.

FIG. 6 illustrates the implementation of additional switches and switch drive circuitry, including a novel self-operating switch, S4.

Switch S2 in series with the LED, is readily implemented by adding Q11, with associated R13 and R14. Transistor Q10 provides turn-on drive to Q11(S2) in the on-time of Q5(S1), Q10 receiving base drive by way of R12, from Q4 collector, so that Q10 is on when Q5(S1) is on, hence, Q11(S2) is on when Q5(S1) is on. As mentioned above, the purpose of Q11(S2) is to assure that the LED will not be, say, "weakly" on, drawing, in effect, "leakage current" from the battery, during the long switch S1, and LED off-time. In the switch S1 and LED off-time, the current drain should be due to recharging current flowing in capacitor C1 and the minimal oscillator operating current.

Switch S3 is implemented by Q9. Switch S3 is normally on during the off-time of S1 and LED, in order to provide a recharging path for capacitor C1 via inductor L1. The on-resistance of switch Q9(S3) is desirably minimal, in order to maintain highest system efficiency, by not degrading the Q of inductor L1. Resistor R1 provides the normally-on base current to Q9(S3), and transistor Q8, driven from Q3 collector by way of Q8 base resistor R10, disables Q9(S3), during the switch S1 and LED, on-time.

Switch S3 may be included in the circuit, in order to eliminate current flow from the input voltage supply, through inductor L1 and switch Q5(S1), during the switch S1 and LED on-time. Without switch S3, the current in L1 will increase from zero, during the switch S1 and LED on-time, reducing system efficiency. The efficiency loss due to base current required by Q9(S3), during switch S1 and LED off-time, must be traded off against the efficiency benefit of including Q9(S3), and against the system cost increase.

A switch, S4, in series with inductor L2, may also be provided. This switch performs a similar function to the function of switch Q9(S3), except, here, the parasitic current flow to be eliminated during switch S1 and LED on-time, is current flowing in inductor L2 to the negative supply line, in effect, in parallel with the current in LED, which current in inductor L2 reduces system efficiency, by reducing the current available to the LED. Since the current in inductor L2 increases with time, as with inductor L1, it is also desirable that L2 have the maximum possible Q, and that the on-resistance of switch Q12(S4) be at a minimum.

A novel self-operating switch S4 is implemented by transistor Q12 in conjunction with resistors R15 and R16.

During the capacitor C1 recharging time, resistor R15 biases switch Q12(S4) on, permitting charging of capacitor C1, through inductor L2.

When switch, Q5(S1) turns on, pulling the left-hand side of capacitor C1 to zero volts, the right-hand side of capacitor C1 is pulled down, ideally, to −Vin. This pulls down the collector of switch Q12(S4) below the emitter of switch Q12(S4) thereby changing the mode of operation of switch Q12(S4) from normal, forward-beta, mode of operation, to reverse-beta mode of operation. In the normal forward-beta mode of operation, switch Q12(S4) is normally expected to have a relatively high forward beta, current gain, say from about 50 to about a few hundred, depending on the transistor type, and operating conditions. In the reverse-beta mode of operation, switch Q12(S4) is normally expected to have a relatively low reverse beta, say from a beta of about less than one to a beta of about a few, depending on the transistor type, and operating conditions. Thus, switch Q12(S4) automatically changes from a high-beta, forward-conduction mode, to a very low-beta, reverse-beta conduction mode, resulting in automatically, substantially, "turning-off" switch Q12(S4), since the magnitude of current flow in switch Q12(S4) is greatly reduced.

In order to use the circuit of the present invention with input supply voltages greater than one cell, and when implementing the circuit with bipolar transistors, as illustrated in FIGS. 5 and 6, it is necessary to take into account the emitter-base breakdown voltage of the bipolar transistors.

The emitter-base breakdown voltage, BVEBO, of small-signal, silicon, planar, epitaxial, bipolar transistors, such as those used in the present invention, is expected to have a typical value of about 6V. It is necessary to provide a safety margin between the maximum reverse voltage to be applied to the base-emitter junction of the transistor, and the expected 6V, typical BVEBO.

The base-emitter voltages of oscillator transistors, Q1 and Q2, reach to about −Vin.

The collector voltage of self-operating switch transistor Q12(S4) also reaches to −Vin. When a transistor is operated in reverse-beta mode, the collector functions as the emitter, and the emitter functions as the collector. The normally-high, forward-mode, collector-emitter breakdown voltage, is replaced by the reverse-mode, breakdown voltage, between emitter, serving as collector, and collector, serving as emitter. The reverse-mode breakdown voltage is [BVEBO+VBE (reverse mode)].

For a wide safety margin for the oscillator circuit, it is desirable to limit the input supply voltage to about half of BVEBO, say about 3V, the voltage of two cells, or, to about 3.4V, in the case of two fully-charged rechargable alkaline cells.

Using the same guideline for self-operating switch transistor Q12(S4) is also desirable.

The voltage-adder circuit of the present invention is particularly suited for use as a LED driver. One important application of the invention is LED-illuminated house-number signs. A DC, battery-operated power source is simple and convenient, and using the voltage-adder circuit of the present invention, only one battery cell is required for most applications. Moreover, the voltage-adder circuit obviates the need for transformers and diodes, which are expensive and energy-inefficient components.

As descibed above, solar energy can be utilized as the power source. In a preferred embodiment, a LED-illuminated house-number sign having a rechargeable cell is hooked up to a solar panel. Preferably, the cell is a single rechargeable alkaline battery cell.

It has been found that the system provided in FIG. 5 has a deficiency, in that occasionally the switch fails to activate. Without wishing to be bound by theory, it is believed that the switch failure is related to the load of capacitors C1 and C2: the load in these capacitors must be different (unbalanced) for the astable multi-vibrator. If, for various reasons, the load becomes balanced, the switch fails to activate.

Figure 7:
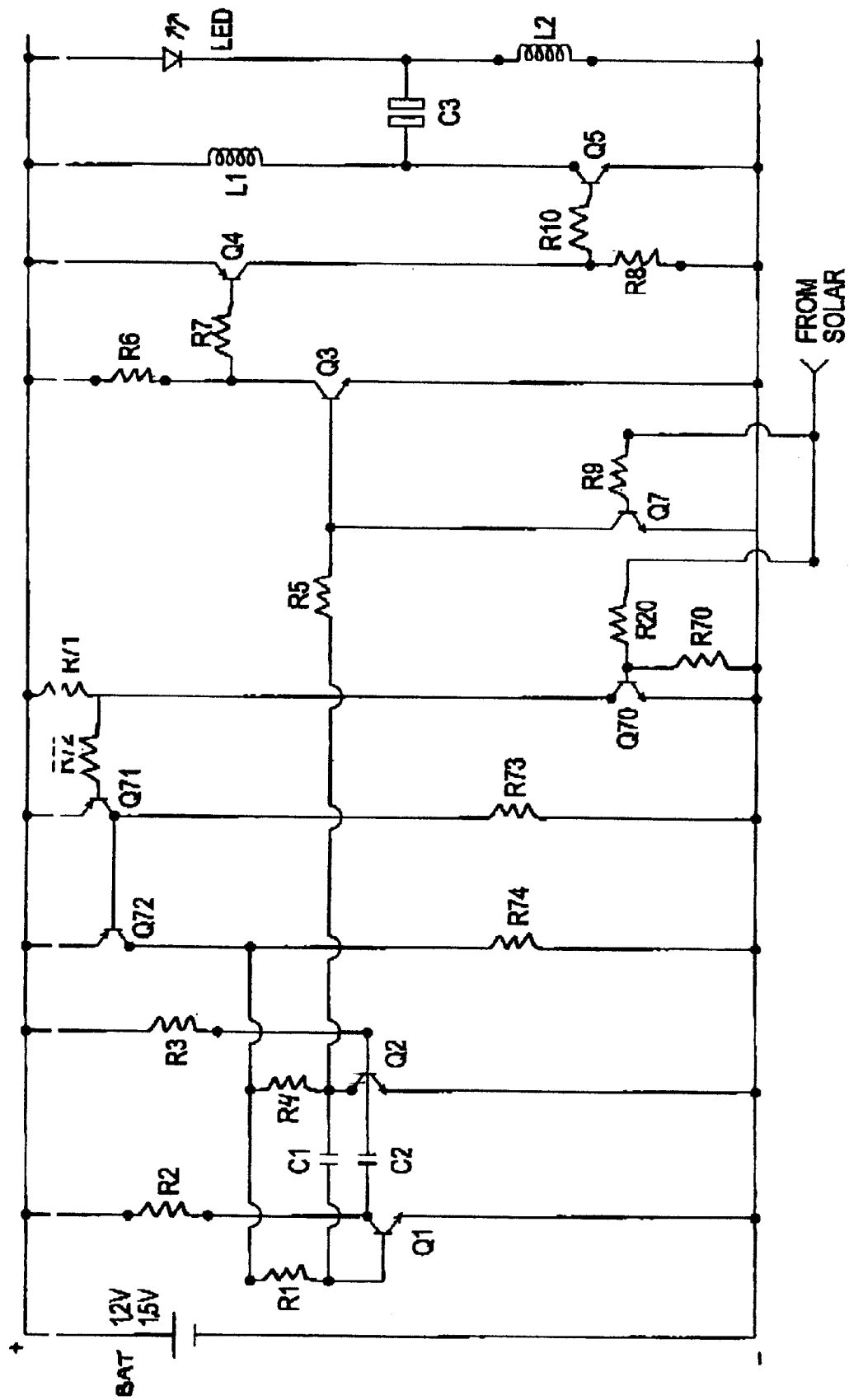
FIG. 7 shows a complete voltage-adder circuit, similar to that of FIG. 5, but having a novel, reliable switching device.

An improved circuit and switch mechanism are provided in FIG. 7. As in FIG. 5, the voltage-adder LED driver circuit of FIG. 7 is used with a solar cell recharging circuit with a single rechargeable alkaline battery cell. The design of the system is such that, in the daytime, when the solar cell is recharging the battery, the LED illumination is not required, and the oscillator is disabled, thereby maximizing the battery recharging capability. When the solar cell output disappears, at night, and the oscillator is required to function, Q7 turns off, and the oscillator must reliably restart.

As compared with FIG. 5, the system of FIG. 7 contains three additional transistors: Q70, Q71, and Q72, and five additional resistors: R70, R71, R72, R73, and R74. Transistor Q6 and the associated resistor of FIG. 5 have been eliminated. The configuration of FIG. 7 provides an alternative switch system having a guaranteed unbalanced starter for the astable multi-vibrator, in which the load of capacitor C1 is always different from the load of capacitor C2.

Transistors Q70, Q71, and Q72 are connected to the input from the plus (+) solar transistor Q7. Transistor Q72 is connected to transistors Q1 and Q2 via resistors R1 and R4, respectively. Preferably, resistors R1 and R4 do not provide an identical resistance. It should also be noted that transistor Q72 is connected to the base of transistor Q1 and to the collector of transistor Q2.

When the sun shines on the solar panel (not shown), transistor Q70 activates transistor Q71, which subsequently shorts the base of transistor Q72 to the positive connection of the battery. As a result, no current can be delivered from transistor Q72 to the astable multi-vibrator.

With nightfall (or when insufficient light is received by the solar panel), transistor Q70 ceases to be operative, such that transistor Q71 is also unactivated. Consequently, transistor Q72 is not shorted, allowing delivery of to current to the astable multi-vibrator.

While the present invention has been explained and preferred embodiments given, this is not to limit the claimed invention to only these implementations. It is evident that many alternatives, modifications and variations will be apparent to those skilled in the art. Accordingly, it is intended to embrace all such alternatives, modifications and variations that fall within the spirit and broad scope of the appended claims.

What is claimed is:

1. A voltage-adder circuit, comprising:

(a) an input voltage supply, having an input supply voltage, and having input and return terminals;

(b) a normally-open first switch, having an off-time and an on-time, having an on-state voltage drop, and having two terminals, one said terminal connected to said return terminal;

(c) a first inductor connected from said input terminal to remaining said switch terminal;

(d) a capacitor, having two terminals, one said terminal connected to the connection of said first inductor and said switch;

(e) a second inductor connected from remaining said capacitor terminal to said input voltage supply return terminal;

(f) a load connected from said input voltage supply input terminal, to the connection of said capacitor and said second inductor;

said capacitor being substantially fully-charged through said first and second inductors, during said off-time, to substantially said input supply voltage, said load receiving substantially the full input supply voltage, by the end of the switch off-time, when said capacitor is substantially fully charged to said input supply voltage, whereby, at the beginning of said switch on-time, said capacitor providing an increased voltage across said load, said increased voltage substantially equal to twice said input supply voltage, minus said on-state voltage drop of said switch.

2. A voltage-adder circuit as in claim 1, further comprising a second switch, in series with said load, said second switch being normally-open, and driven in-phase with said normally-open first switch.

3. A voltage-adder circuit as in claim 1, wherein said load includes a LED.

4. A voltage-adder circuit as in claim 1, wherein said load includes:

a rectifier diode having anode and cathode terminals, said cathode terminal of said rectifier diode connected to said connection of said capacitor and said second inductor, and a second capacitor connected from said anode terminal of said rectifier diode to said input voltage supply, whereby, said second capacitor receives charge from said first capacitor, during said switch on-time, said rectifier diode preventing discharging of said second capacitor, by said second inductor, during said switch off-time.

5. A voltage-adder circuit as in claim 1, further comprising:

a normally-closed first switch, driven in opposite phase to said normally-open first switch, said normally-closed first switch in series with said first inductor, said normally-closed first switch for disconnecting said first inductor from said input voltage supply during said normally-open first switch on-time.

6. A voltage-adder circuit as in claim 1, further comprising a self-operating switch in series with said second inductor, said self-operating switch including a transistor and a resistor, said resistor connected from said input voltage supply input terminal to base terminal of said transistor, said self-operating switch being automatically, substantially, turned off by the application of a negative collector voltage.

* * * * *